H. A. Robinson.
Weather Strip.

Nº 92367. Patented Jul. 6. 1869.

Witnesses.
J. A. Heath
H. W. Beadle.

Inventor.
H. A. Robinson
By N. Crawford
Attorney.

UNITED STATES PATENT OFFICE.

HORACE A. ROBISON, OF CLEVELAND, OHIO.

IMPROVED WEATHER-STRIP.

Specification forming part of Letters Patent No. 92,367, dated July 6, 1869.

*To all whom it may concern:*

Be it known that I, H. A. ROBISON, of Cleveland, in the county of Cuyahoga and State of Ohio, have invented certain new and useful Improvements in Weather-Strips; and I do hereby declare that the following is a full and complete description of the same, reference being had to the accompanying drawings, making part of this specification, in which—

Figure 1:
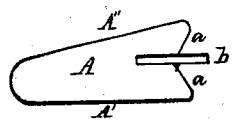
Figure 2:
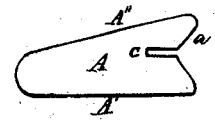

Figure 1 is a sectional end view of the molding complete. Fig. 2 is an end view of the molding ready for the rubber strip.

Heretofore weather-strips have been formed with one side having a plane face, the other having a molding of some form wrought thereon for the purpose of ornamentation.

These moldings must be made of hard and solid wood, which is never entirely straight in the grain, and the operation of dressing the molding will in many instances leave the surface rough, and in such state cannot be used by reason of the rough and broken surface caused by the cutter used for dressing the wood working against the grain, and so much thereof as may be in such condition has to be cut out and thrown away, and is entirely lost. But by the shape of the molding that I adopt and by dressing both sides of the same at one operation, while one bit cuts against the grain of the wood on one side, the bit on the other side is cutting with the grain, and leaves the surface smooth, by which form the molding will be smooth on one side or the other, and the smooth side is selected for the face side or the side to be seen when in use.

The invention, therefore, consists in the molding formed in the shape seen in the drawings, and so that either side may be attached to a window or door-jamb, and having a wide shallow groove in its thick edge to receive the rubber strip when bent in either direction, and a narrow, deep groove with the rubber fast therein.

In the drawings, A represents the molding in end section, having a wide, shallow groove, $a$, on its thick edge, and a narrow, deep groove, $c$, which receives the rubber strip $b$.

After the dressing of the molding in its outline form, and before it is grooved, it is determined which is to be the face or side to show when in position. The groove $c$ that contains the rubber strip $b$ is made parallel with the side $A'$ of the molding, so that when the rubber strip $b$ is inserted and fixed therein, it will not have the same relative position to side $A''$ that it has to side $A'$. This is important where the molding is applied to the jamb of a door, as the door in swinging to be closed comes in contact with the rubber strip and carries it toward side $A'$ of the molding. The rubber is kept in contact with the door by reason of its elasticity and freedom to act in groove $a$, which receives it in its bent form and prevents its projection much beyond the points of the molding A, which allows the molding to be placed nearer to the door or sash and not show the rubber.

The groove $c$ may be so made as to give to the rubber the same relative position with the two sides $A'$ and $A''$, and will answer all the purposes intended in stopping against window-sash, as in such case no force is applied to bend the rubber in either direction, but only to force it back into wide groove $a$, and still be in close contact with the sash, and always insure a wind and dust tight joint.

The molding thus constructed and in the form described has advantages both in its construction and application, as it costs less by reason of but little waste in sawing from the board or plank, and much less in dressing and smoothing, as there are no deep cuts to form ornamental figures thereon, and twenty per cent. more lineal feet, having the same width of face, can be taken from a given amount of rough lumber, is easier applied, the rubber will not lose its elasticity, because there is no friction upon it, and it does not project so as to be seen when in its place; further, inexperienced hands will put it in position much better than they can the ordinary molding.

Another great advantage is the manner of disposing of the rubber strip in the wide groove, by which the rubber is not worn or cut away by contact with the friction of the door in opening or closing, as it is only bent within the groove $a$, and there held in its position by the extreme points of the molding, and does not come between the edge of the molding and the door, as is the case with the ordinary molding without the groove $a$. Either side of this molding can be used as the face.

I am aware that the edges of doors have been made with a wide, shallow groove and a narrow, deep groove to receive the rubber. Such invention I do not claim, as my invention relates only to a removable molding, constructed as described; nor do I broadly claim for the wide shallow groove. I am also aware that moldings for weather-strips have been made in which the rubber has been inserted at an angle in one direction or the other to the plane side of such molding; but such molding has not the wide shallow groove on both sides of the rubber, as described as my invention.

Having thus described my invention, what I claim as new, and desire to secure by Letters Patent, is—

The weather-strip herein described, consisting of the molding A, with the two inclined plane sides A' and A'', and having in its thick edge the wide, shallow groove $a$, deep, narrow groove $c$ parallel with side A', and containing the rubber strip $b$, all constructed and arranged in the manner and for the purpose set forth.

HORACE A. ROBISON.

Witnesses:
W. H. BURRIDGE,
FRANK S. ALDEN.